(12) United States Patent
Wang

(10) Patent No.: US 10,128,709 B2
(45) Date of Patent: Nov. 13, 2018

(54) ELECTRIC MACHINES

(71) Applicant: The University of Sheffield, Sheffield, South Yorkshire (GB)

(72) Inventor: Jiabin Wang, Shireoaks (GB)

(73) Assignee: The University of Sheffield, Sheffield (GB)

( * ) Notice: Subject to any disclaimer, the term of this patent is extended or adjusted under 35 U.S.C. 154(b) by 232 days.

(21) Appl. No.: 14/648,602

(22) PCT Filed: Nov. 29, 2013

(86) PCT No.: PCT/GB2013/053165
§ 371 (c)(1),
(2) Date: May 29, 2015

(87) PCT Pub. No.: WO2014/083352
PCT Pub. Date: Jun. 5, 2014

(65) Prior Publication Data
US 2015/0311758 A1 Oct. 29, 2015

(30) Foreign Application Priority Data
Nov. 30, 2012 (GB) .................................. 1221635.4

(51) Int. Cl.
*H02K 3/28* (2006.01)
*H02K 21/14* (2006.01)
*H02K 1/00* (2006.01)

(52) U.S. Cl.
CPC .................. *H02K 3/28* (2013.01); *H02K 1/00* (2013.01); *H02K 21/14* (2013.01)

(58) Field of Classification Search
CPC ............. H02K 3/28; H02K 1/00; H02K 21/14
(Continued)

(56) References Cited

U.S. PATENT DOCUMENTS 3,118,099 A * 1/1964 Daws ....................... H02K 3/28
318/773
4,492,890 A * 1/1985 MacDonald ............. H02K 3/28
310/184
(Continued)

FOREIGN PATENT DOCUMENTS

GB 2025702 A 1/1980
GB 2437568 A 10/2007
(Continued)

OTHER PUBLICATIONS

International Search Report and Written Opinion issued by the European Patent Office for International Application No. PCT/GB2013/053165 dated Feb. 2, 2015 (13 pages).
(Continued)

*Primary Examiner* — Forrest M Phillips
(74) *Attorney, Agent, or Firm* — Wilmer Cutler Pickering Hale and Dorr LLP

(57) ABSTRACT

An electric machine comprising:
a) a first means for providing a first magneto motive force comprising a first set of magneto motive force space harmonics comprising odd and even harmonic subsets, each harmonic in said first set of magneto motive force space harmonics having a respective amplitude, wherein one of said odd or even subsets of said first set of magneto motive force space harmonics comprises a dominant working harmonic and the other of said odd or even subsets of said first set of magneto motive force space harmonics comprises a dominant undesirable harmonic; and
b) a second means for providing a second magneto motive force comprising a second set of magneto motive force space harmonics comprising odd and even harmonic
(Continued)

subsets, each harmonic of said second set of magneto motive force space harmonics having a respective amplitude, wherein one of said odd or even subset of said second set of magneto motive force space harmonics comprises a dominant working harmonic and the other of said odd or even subset of said second set of magneto motive force space harmonics comprises a dominant undesirable harmonic;

wherein the net effect of said first and second means provides a resultant magneto motive force comprising a resultant set of magneto motive force space harmonics comprising odd and even harmonic subsets, each harmonic of said resultant set of magneto motive force space harmonics having a respective amplitude, wherein one of said odd or even subsets of said resultant set of magneto motive force space harmonics comprises a dominant working harmonic and the other of said odd or even subsets of said resultant set of magneto motive force space harmonics comprises a dominant undesirable harmonic, wherein the amplitude of the dominant undesirable harmonic of the resultant set of magneto motive force space harmonics is at least reduced relative to the amplitudes of the dominant undesirable harmonics of the first and second sets of harmonics.

14 Claims, 14 Drawing Sheets

(58) Field of Classification Search
USPC ........................................................ 310/198
See application file for complete search history.

(56) References Cited

U.S. PATENT DOCUMENTS

| | | | |
|---|---|---|---|
| 5,898,251 A * | 4/1999 | Mochizuki | H02K 3/28 29/596 |
| 6,166,471 A | 12/2000 | Kometani et al. | |
| 6,759,780 B2 * | 7/2004 | Liu | H02K 3/28 29/596 |
| 6,770,998 B2 * | 8/2004 | Wauke | G11B 19/2009 310/179 |
| 6,979,926 B2 * | 12/2005 | Ogawa | H02K 3/12 310/179 |
| 7,348,705 B2 | 3/2008 | Cai et al. | |
| 8,183,734 B2 * | 5/2012 | Saban | H02K 1/02 310/179 |
| 2003/0085627 A1 * | 5/2003 | Lipo | H02K 3/28 310/12.22 |
| 2012/0007461 A1 | 1/2012 | Wang et al. | |
| 2012/0025634 A1 | 2/2012 | Dajaku | |

FOREIGN PATENT DOCUMENTS

| | | |
|---|---|---|
| WO | WO-2010/040785 A2 | 4/2010 |
| WO | WO-2012/107035 A2 | 8/2012 |
| WO | WO-2014/083352 A2 | 6/2014 |

OTHER PUBLICATIONS

United Kingdom Search Report issued by the United Kingdom Intellectual Property Office for Application No. GB1221635.4 dated Apr. 2, 2013 (5 pages).
Volzh Inzh Ped Inst, English Language Abstract of Russian Patent Application Publication 94041331,1 page (Sep. 20, 1996).

* cited by examiner

ELECTRIC MACHINES

Embodiments described herein relate to electric machines.

BACKGROUND

Motors and generators are examples of electric machines. Motors convert an electrical input to a mechanical output. Generators convert a mechanical input to an electrical output.

Embodiments of the present invention may provide improvements over background arrangements.

BRIEF DESCRIPTION OF THE DRAWINGS

Embodiments are further described hereinafter, by way of example, with reference to the accompanying drawings, in which.

DETAILED DESCRIPTION

Electric machines generally comprise a rotor and a stator both having associated magnetic fields. The stator and the rotor are journalled with an airgap therebetween. A travelling magnetic field (linear in linear machines and rotating in rotating machines) is formed by the stator in the airgap and interacts with the rotor magnetic field to produce electro-mechanical energy conversion when the rotor moves with respect to the stator. Certain machines are classified as fractional slot per phase per pole machines where a q-value of the machine is a fractional number given by:

$$q = N/(m \times 2p)$$

where N is the number of slots in the stator, p is the number of pole pairs and m is the number of phases in the machine.

Many feasible slot and pole combinations exist for fractional-slot per phase per pole machines. A subset of these combinations is defined by the relationship $N=2p\pm1$. For 3-phase machines, N must be divisible by three and the phase shift in electrical degrees between phases must equal $\pm 2\pi k + 2\pi/3$ electrical degrees, where $k=0, 1, 2, \ldots$. Slot and pole combinations that meet this definition are listed in Table 1 for $p \geq 4$ and up to 23.

TABLE 1

Slot-pole combinations of example $N = 2p \pm 1$ machines

| Number of pole-pairs p | Feasible slot number N | q |
|---|---|---|
| 4 | 9 | 3/8 |
| 5 | 9 | 3/10 |
| 7 | 15 | 5/14 |
| 8 | 15 | 5/16 |
| 10 | 21 | 7/20 |
| 11 | 21 | 7/22 |
| 13 | 27 | 9/26 |
| 14 | 27 | 9/28 |
| 16 | 33 | 11/32 |
| 17 | 33 | 11/34 |
| 19 | 39 | 13/38 |
| 20 | 39 | 13/40 |
| 22 | 45 | 15/44 |
| 23 | 45 | 15/46 |
| ... | ... | ... |

Any integer multiple of the slot and pole numbers of a given slot and pole combination in Table 1 also results in a feasible combination with the same q (using the same integer multiple for slots and pole pairs). For example, based on the first row of Table 1, 18-slot and 8-pole pairs (i.e. 2×9-slots and 2×4-pole pairs), 27-slot and 12-pole pairs (i.e. 3×9-slots and 3×4-pole pairs), etc, all have q=3/8. Machine designs with $N=2p\pm1$ have advantages of fractional slot permanent magnet machines such as high torque capability and low torque ripple but result in a large number of undesirable magneto motive force (mmf) harmonics and unbalanced normal (in radial direction) magnetic forces in the airgap between the stator and the rotor.

Figure 1:
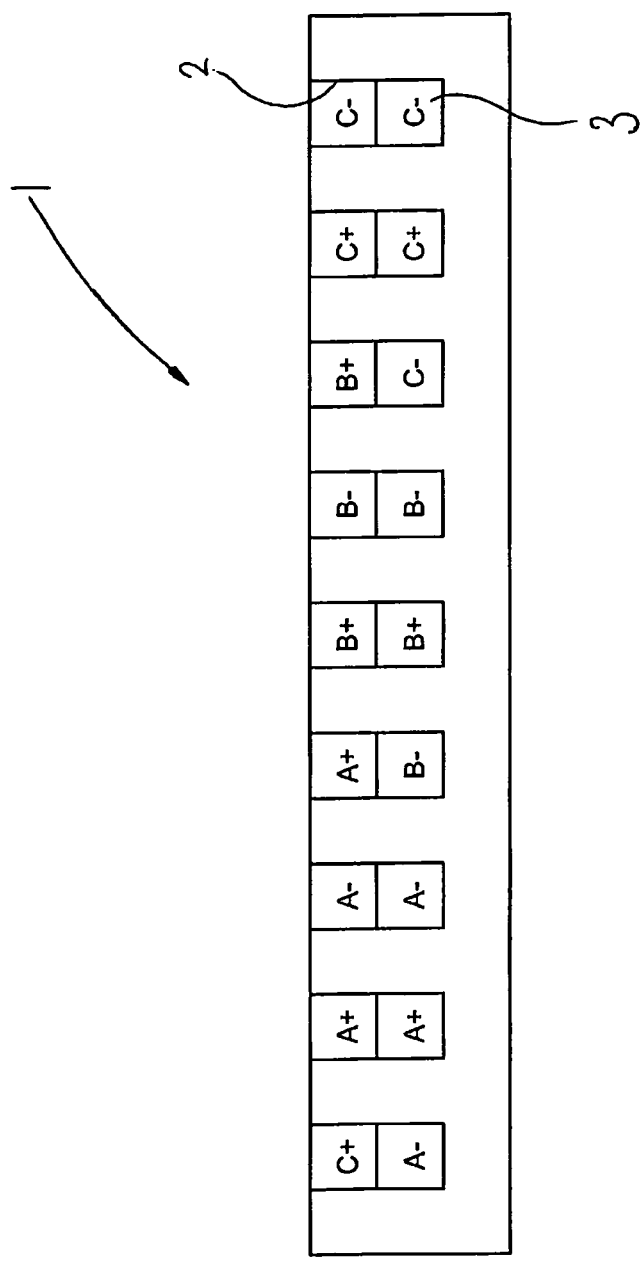
FIG. 1 is a view of a stator of an electrical machine.

FIG. 1 shows a stator 1 according to the 4-pole pair example in Table 1. The stator is shown as a linear stator, which may be for a linear machine or a rotary machine where the annular stator is flattened out for illustration purposes (the rotor is not shown). The stator comprises 9-slots 2, each containing coil windings of a set of phase windings 3. When energised, the coils produce a magnetic field that has magneto-motive force (mmf) components. The mmf components can be represented along the stator length by a series of harmonics having a fundamental period of $2\pi$ mechanical radians (for linear machines, each slot may be displaced from the next slot by $2\pi/N$ mechanical radians which is equivalent to 2pt/N mechanical length where t is the pole-pitch). As the current in the coils changes with time, the mmf components vary and the mmf harmonics produce a travelling magnetic field along the stator length.

Figure 2:
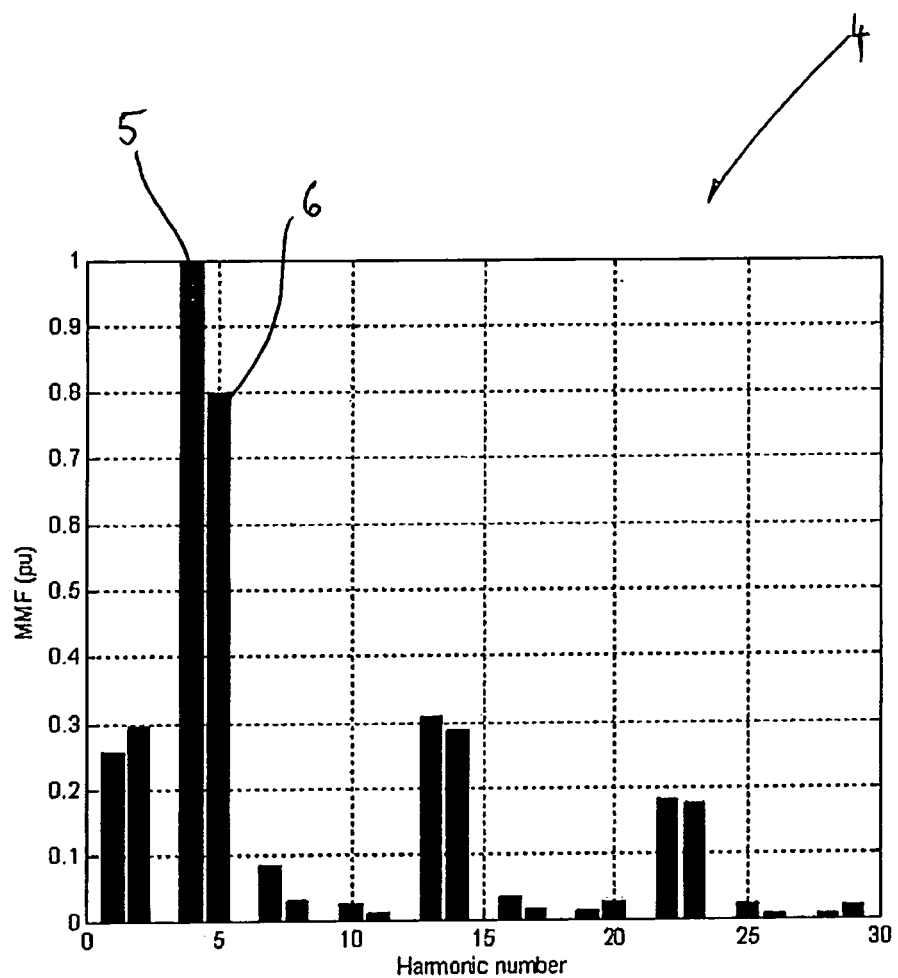
FIG. 2 is a graph of the magneto motive force harmonics for the electric machine of FIG. 1.

A normalised harmonic distribution 4 for the mmf harmonics of the 4-pole pair 9-slot machine is shown in FIG. 2. The amplitude of each harmonic is normalised to the amplitude of the largest amplitude harmonic. The mmf harmonics contain forward rotating harmonics for $n=1, 4, 7, \ldots$, backward rotating harmonics for $n=2, 5, 8, \ldots$, and zero triplen harmonics (i.e. $n=3, 6, 9, \ldots$) because of the 3-phase nature of the machine. For the 4-pole-pair machine, however, only the 4-th mmf harmonic interacts with the magnetic field of the rotor to produce continuous torque. The 4-th harmonic is therefore also called the dominant working harmonic. The number of pole pairs on the rotor is chosen so the dominant harmonic has the same number of peaks (or poles) in its waveform as the number of pole pairs on the rotor. Therefore, the dominant harmonic provides torque to the machine. The other harmonics, in particular the 5-th, which has relatively large magnitude and rotates at double the speed with respect to the rotor, may cause undesirable effects, such as localized core saturation, additional iron loss, and eddy current loss in the magnets, etc. The 5-th harmonic is therefore called the dominant undesirable harmonic 6.

Undesirable harmonics may rotate at different speeds with respect to the rotor and may cause undesirable effects, as described previously, such as localized core saturation, additional iron loss, and eddy current loss in the magnets, etc. The dominant undesirable causes the most undesirable effects and in N=2p±1 machines, the dominant undesirable harmonic is the harmonic before or after the working harmonic in the harmonic series. It's proximity to the dominant working harmonic also contributes to it being termed the dominant undesirable harmonic. However, the dominant working harmonic and the dominant undesirable harmonic are in different sets (e.g. even subset and odd subset).

Embodiments of the present invention are concerned with techniques for reducing the number of and/or amplitude of the undesirable mmf harmonics and eliminating or reducing the unbalanced magnetic force such as those associated with the slot and pole combinations shown in Table 1, and any other combination derived from an integer multiple of a given combination listed in Table 1.

Figure 3:
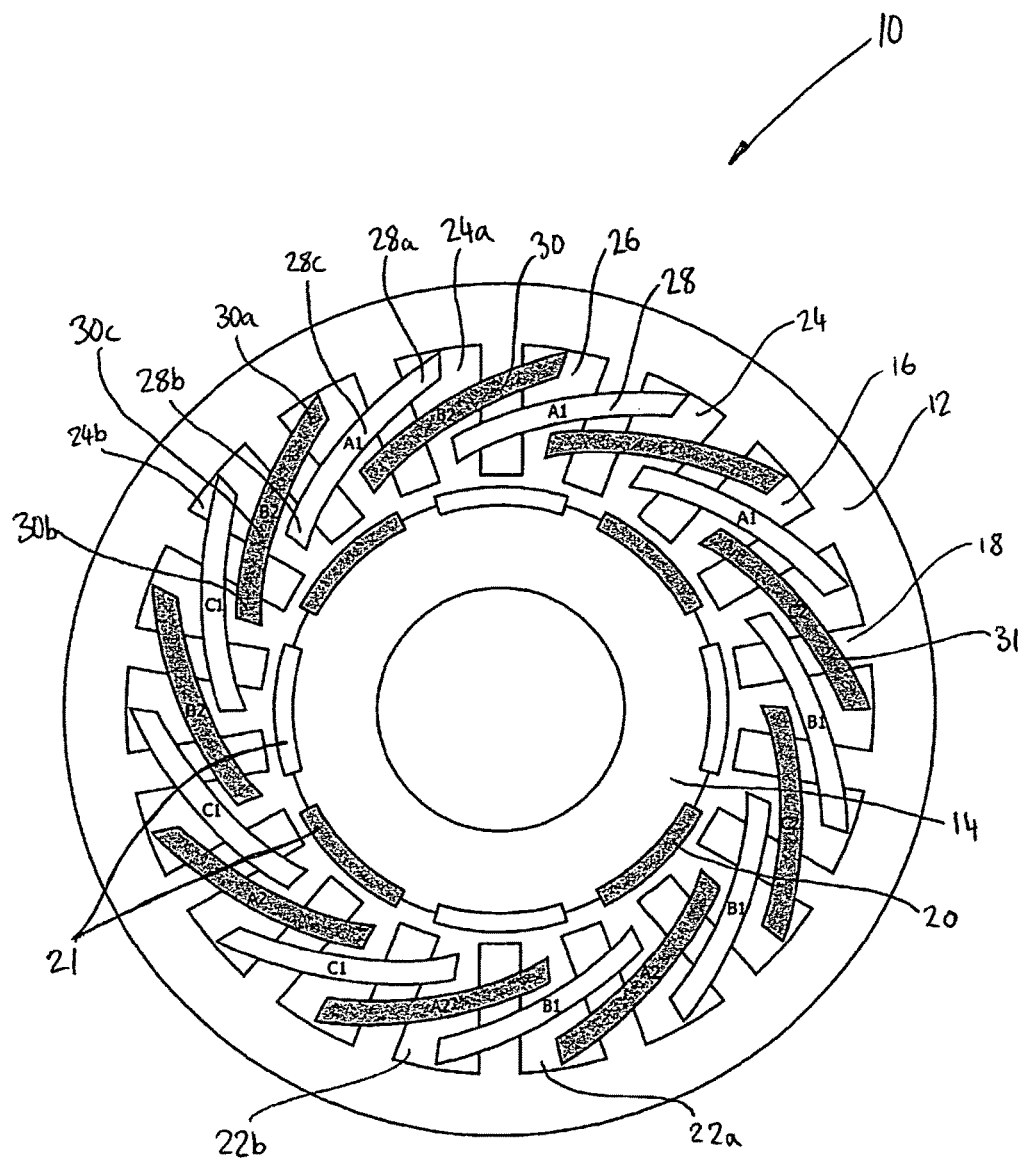
FIG. 3 is an end projection of an electric machine according to an embodiment of the present invention.

FIG. 3 schematically shows an electric machine 10 according to an embodiment of the present invention. The machine comprises a stator 12 and a rotor 14. The stator comprises slots 16 and teeth 18. In FIG. 3, there are 18-slots and 18-teeth. However, this can be generalised to N-slots, where N is an integer and in this case N=18. The rotor 14 comprises poles 20 arranged in pole pairs 21 comprising a North and a South pole. FIG. 3 shows the rotor comprising 4-pole-pairs. The number of pole pairs can be generalised to p-pole pairs, where p is an integer. Each slot 22a is offset from the next slot 22b by $2\pi p/N$ electrical radians, or $360p/N$ electrical degrees. The relationship of the number of slots N to the number of pole pairs p, is therefore given by N=s(2p±1) where s=2.

The slots are separable into a first set of discontiguous slots 24 and a second set of discontiguous slots 26. The first set of discontiguous slots 24 comprises a first set of phase windings 28 comprising, in this example, three phase windings A1, B1, C1. The second set of discontiguous slots 26 comprises a second set of phase windings 30 comprising, in this example, three phase windings A2, B2, C2. In the example of FIG. 3, the first set of discontiguous slots 24 are discontiguous as between any pair of slots in the first set of slots (linearly or circumferentially) there is at least one slot from the second set of slots 26. It should be noted that the slot sets are discontiguous so as there is an active slot between the slots of a slot set. A dummy slot positioned between two slots of a slot set could lead to the use of the term discontiguous. Each of the phase windings A1, A2, B1, B2, C1, C2 comprises coils 31 having a first coil part 28a, 30a and a second coil part 28b, 30b, connected at the ends by end coil parts 28c, 30c (only one end winding is visible in FIG. 3). Each first and second coil part is positioned in slots 16 such that, for example, the first coil part 28a is in slot 24a and second coil part 28b is in slot 24b. FIG. 3 is a cross-section and therefore it should be noted that the first and second coil parts extend into the figure. In the embodiment of FIG. 3, the first phase windings A1, B1, C1 are offset from the second phase windings A2, B2, C2 by 9-slots. This corresponds to an offset of π mechanical radians or 180 mechanical degrees.

Figure 4:
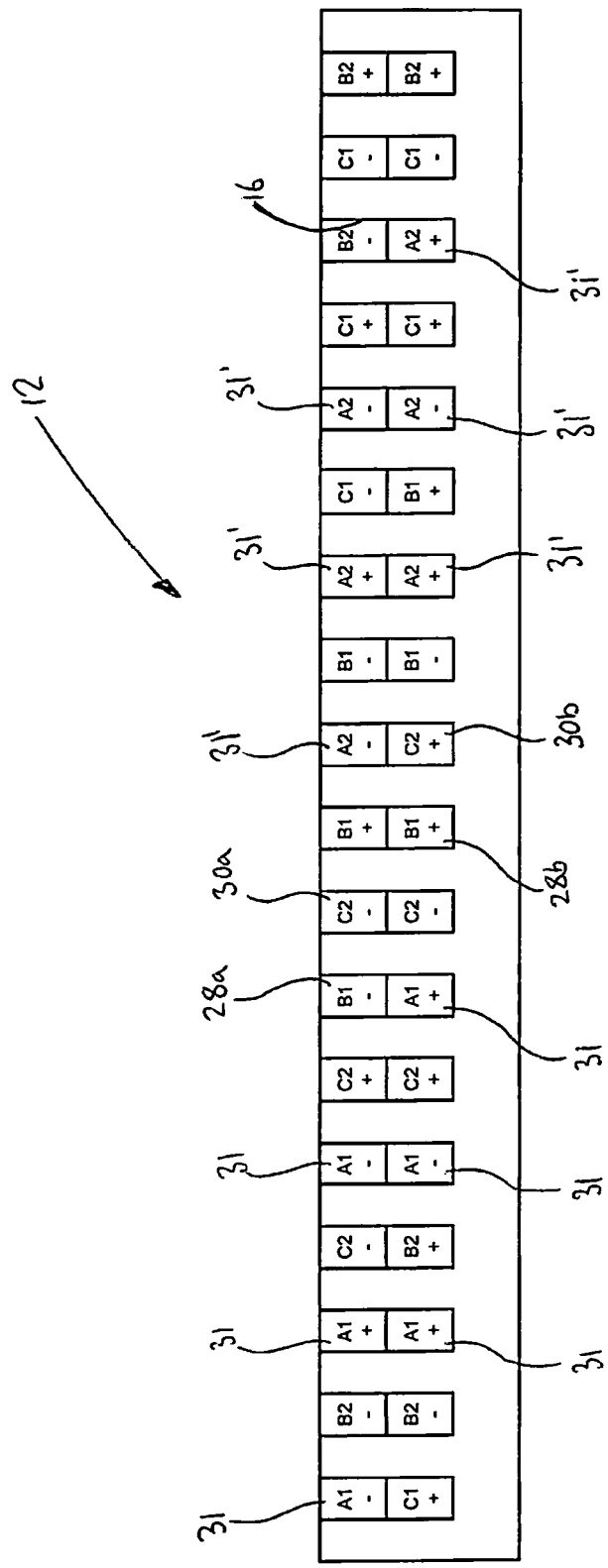
FIG. 4 is a view of the stator of the electric machine of FIG. 3.

FIG. 4 shows the stator 12 of the machine 10 flattened out. This machine is configured to work with a 4-pole pair rotor, which is not shown in this figure. The phase winding sets are again labelled as A1, B1, C1 and A2, B2, C2, and each contain three phase windings i.e. A, B, C. Each phase winding comprises three energisable coils that are electrically connected. Each coil has an energising direction, which is the direction that an electric current flows around the coil. In a motor configuration the energising direction does not change but the current direction, from an alternating supply, will change. The energising direction of the coil results in each slot winding (28a, 28b, 30a, 30b, FIG. 3) having an energising direction denoted by + or −. The energising direction of the first and second slot windings are opposite to each other in the example of FIG. 3. The energising direction in each slot winding creates a polarity of the coil. Each phase winding A1, B1, C1, in the first phase winding set has a corresponding phase winding A2, B2, C2 in the second phase winding set i.e. A1 and A2 correspond as do B1 and B2, and C1 and C2.

The corresponding phase windings (e.g. elements 31 and 31') are offset by 9-slots. As mentioned, each slot is offset by $2\pi p/N$ electrical radians. Therefore, in the current example, the corresponding phase parts are offset by $18\pi p/N$. This slot offset φ may be generalised to $w2\pi p/N$ electrical radians where w=9. In the current example there are 18-slots and 4-pole pairs. The slot offset φ is therefore equal to 4π. The corresponding phase windings, e.g. A1 and A2, are connected in series or in parallel with the same polarity (i.e. the energising direction is the same for each phase winding with respect to the stator). Therefore the alternating current in those phase windings is in phase, i.e. there is no polarity offset θ between the corresponding phase windings. A total offset between corresponding phase windings is found from the sum of the polarity offset θ and the slot offset φ. For the embodiment shown in FIG. 3 and FIG. 4, the polarity offset θ=0.

Returning to FIG. 3, in some embodiments the electric machine 10 is able to perform as an electric motor or a generator. As a motor, the first and second phase winding sets 28, 30 are energised using a 3-phase alternating current. This causes a magnetic field to be generated in the machine. The poles 20 of the rotor 14 are provided with magnets that are attracted to or repelled by the magnetic field of the phase windings. The rotor 14 therefore rotates to minimise the potential energy of the magnetic field. As a generator, a mechanical force rotates the rotor 14. The poles 20 are provided with magnets that generate a magnetic field. Rotation of the rotor moves the rotor magnetic field over/through the phase winding sets 28, 30 and induces a voltage and current in the coils. In turn, the current in the coils generates a magneto motive force (mmf) component. Variance in the current causes the mmf component of each coil to vary. The variance of the mmf components across all of the coils in a phase winding set approximates to harmonic components of a fundamental sine wave for that phase winding set. The harmonic components for each coil set are shown in FIG. 2 as discussed above. As the rotor moves and/or the current in the coils alternates, the mmf harmonics travel around or along the stator-rotor airgap. The mmf harmonics are travelling magnetic fields having a number of poles formed by the peaks and troughs of their waveform. As the rotor 14 rotates, the interaction of the travelling (rotating or linear)

magnetic field of the phase windings and the magnetic field of the rotor produces continuous torque.

The harmonic components are separable into odd and even harmonics. Each harmonic has an order n. The machine has working harmonics. Of those, there is a dominant working harmonic, which provides torque to the machine and contains a number of pole pairs (peaks and troughs of the magnetic field waveform) equal to the number of pole pairs on the rotor and therefore for the dominant working harmonic, n=p. Undesirable harmonics also exist and include a dominant undesirable harmonic which is most detrimental to the operation of the machine. In N=2p±1 machines, the dominant undesirable harmonic has an order n' which is equal to p±1. The dominant working harmonic of the current example is the 4-th harmonic and is therefore in the even subset. The dominant undesirable harmonic is the 5-th harmonic.

In some embodiments of the present invention, mmf harmonics from the first phase winding set constructively or destructively interfere with those from the second phase winding set. Constructively interfering harmonics are preserved. The arrangement of the phase winding sets preserves the dominant harmonic n=4 because the 4-th harmonic of the first mmf components is in phase with the 4-th harmonic of the second mmf components. All of the even harmonics are also in phase and therefore remain, with the exception of the even triplen (6, 12, 18 . . . ) harmonics, which are cancelled in 3-phase systems. The offset of 180 mechanical degrees between the first phase winding and the second phase winding means that the odd space harmonics of the first mmf components are out of phase with the odd space harmonics of the second mmf components. Therefore, the dominant undesirable harmonic, which in this example is the 5-th harmonic, is cancelled.

Figure 5:
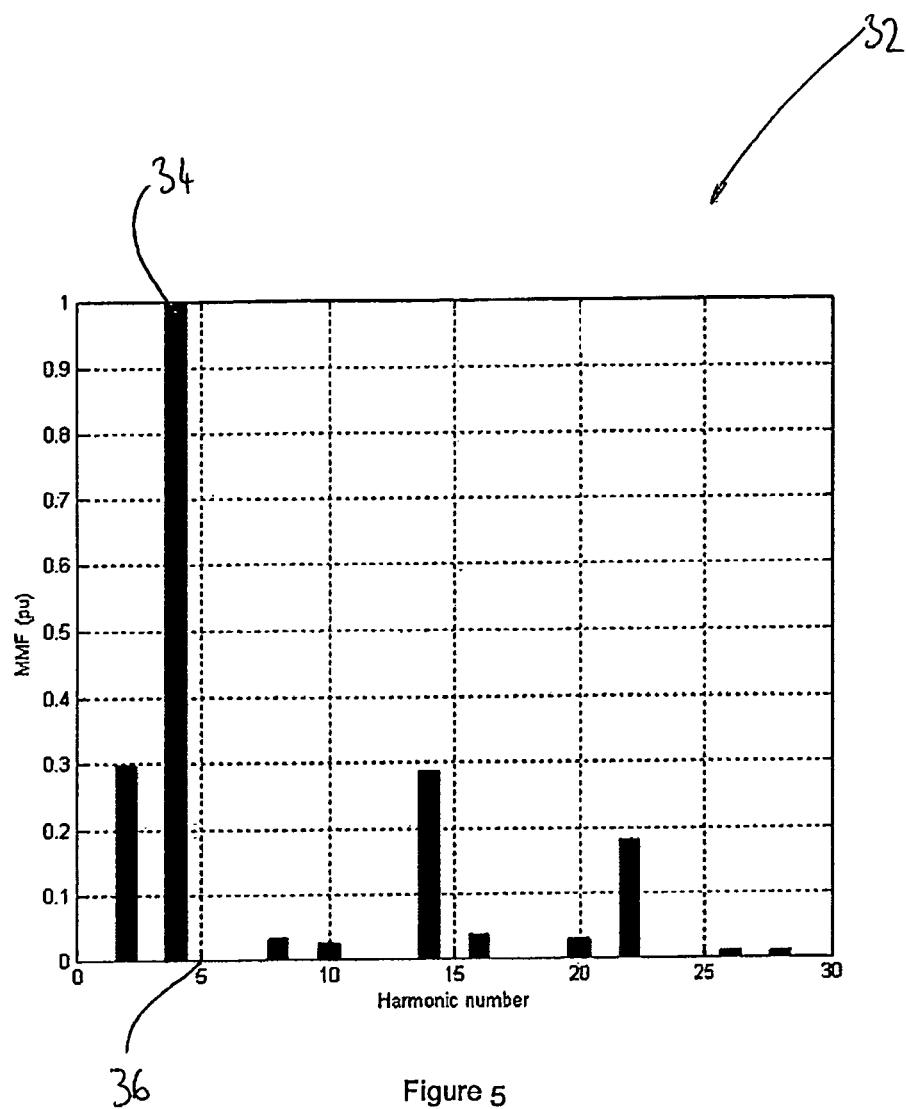
FIG. 5 is a graph of the magneto motive force harmonics for the electric machine of FIGS. 3 and 4.

FIG. 5 shows the normalised mmf harmonic content 32 of the 4-pole-pair rotor as described with reference to FIGS. 3 and 4 above. The harmonic content is a combination of the harmonics from the mmf components of the first 3-phase winding set A1, B1 and C1 and the second 3-phase winding set A1, B1 and C1 as they are offset by 180 mechanical degrees. The harmonic content of the resultant magnetic field is shown. The dominant working harmonic 34 is the 4-th harmonic and the dominant undesirable harmonic is the 5-th harmonic 36. FIG. 5 shows that the dominant working harmonic 34 remains while the dominant undesirable harmonic 36, as shown in FIG. 2 (element 6), has been cancelled. Furthermore, as mentioned previously, all odd harmonics have also been cancelled. The 18-slot 4-pole-pair machine therefore has a reduced number of undesirable harmonics with the amplitude of the harmonics in the odd subset at least reduced but preferably cancelled so that the relative amplitude of the dominant undesirable harmonic of each mmf component is at least reduced preferably to zero.

The remaining harmonics in the even subset have relatively low magnitudes except for the 2-nd, 14-th and 22-nd order harmonics. However, since the wavelength of the 14-th and 22-nd harmonics is relatively short, the resulting magnetic field due to these harmonics is attenuated rapidly in the radial direction towards the rotor. Therefore the undesirable effects caused by these harmonics are much less significant than those caused by the dominant undesirable harmonic. Furthermore, the frequency of the 2-nd harmonic seen by the rotor is relatively low and the resultant undesirable effect is also significantly less than that caused by the dominant undesirable harmonic.

The arrangement of FIG. 1 does not permit cancellation of harmonics in the manner described in relation to FIGS. 3 to 5, as the arrangement of FIG. 1 does not have multiple phase windings that act on one another to cancel selectable harmonics.

The winding configuration shown in FIG. 4 results in the highest possible winding factor for the $4^{th}$ order working space harmonics, and in some embodiments allows for the complete elimination of all odd space harmonics, while preserving the key advantage of the fractional-slot per phase per pole winding schemes. Further, the normal magnetic force produced by the first 3-phase windings is cancelled by that produced by the second 3-phase windings, thereby, eliminating or reducing unbalanced magnetic pull in the radial direction, which is conducive for reducing bearing loss, noise and vibration.

Figure 6:
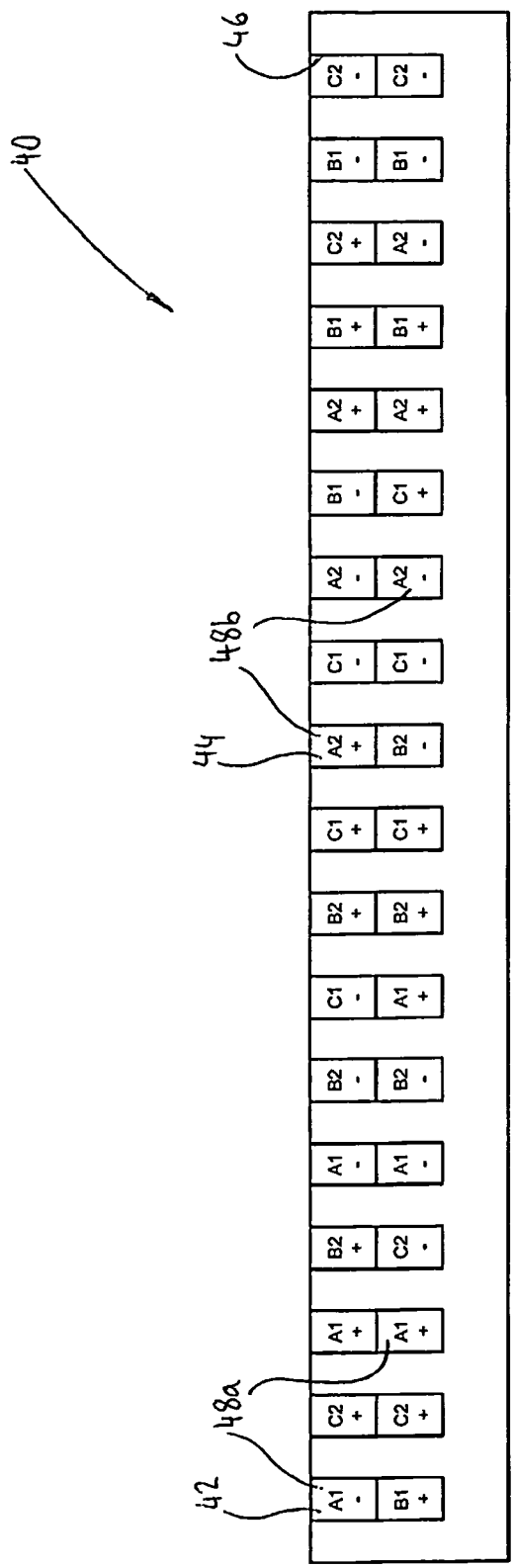
FIG. 6 is a view of a stator for use in an electric machine according to an embodiment of the present invention.

FIG. 6 shows another stator 40 according to an embodiment of the present invention. The stator comprises a first 42 and second 44 phase winding sets as per the stator described in FIG. 4. However, the order of the phase windings around the stator is configured to work with a 5-pole pair rotor (not shown). Therefore, the positions of phases B and C are swapped to configure the machine in this way. As per FIG. 2, there are corresponding phase windings A1 and A2, B1 and B2, and C1 and C2. The corresponding phase windings have a mechanical offset of 9-slots 46. The direction of slot windings are again shown by + or −. In this example, the corresponding phase winding coils have an opposite energising direction to each other i.e. A1+ to A1− 48a is offset by 9-slots to A2− to A2+ 48b. The opposite energising direction corresponds to a polarity offset θ=π. The offset for the 5-th harmonic therefore equals 5π+π=6π and so the 5-th order harmonic is preserved while the 4-th order harmonic is cancelled or at least reduced. The opposite energising direction is created by connection of opposing ends of the windings in series or parallel to create an opposite polarity connection.

The dominant working harmonic of the current example is the 5-th harmonic. The dominant undesirable harmonic is the 4-th harmonic. As with the example of FIGS. 3 to 5, the mmf harmonics of the first phase winding set and the mmf harmonics of the second phase winding set interact. The offset of the mmf harmonics means that the 5-th (p-th) harmonic of the first travelling magnetic field is in phase with the 5-th harmonic of the second travelling magnetic field. All of the odd harmonics are also in phase and therefore remain, with the exception of the odd triplen (3, 9, 15 . . . ) harmonics, which are cancelled because of the 3-phase nature of the machine. The offset of nπ+π for each harmonic, where n is the harmonic number, means that the even space harmonics of the first mmf components are out of phase with the even space harmonics of the second mmf components. The antiphase of the even space harmonics from each mmf component causes cancellation of those even space harmonics. Therefore, the dominant undesirable harmonic, which in this case is the 4-th harmonic, is cancelled.

Figure 7:
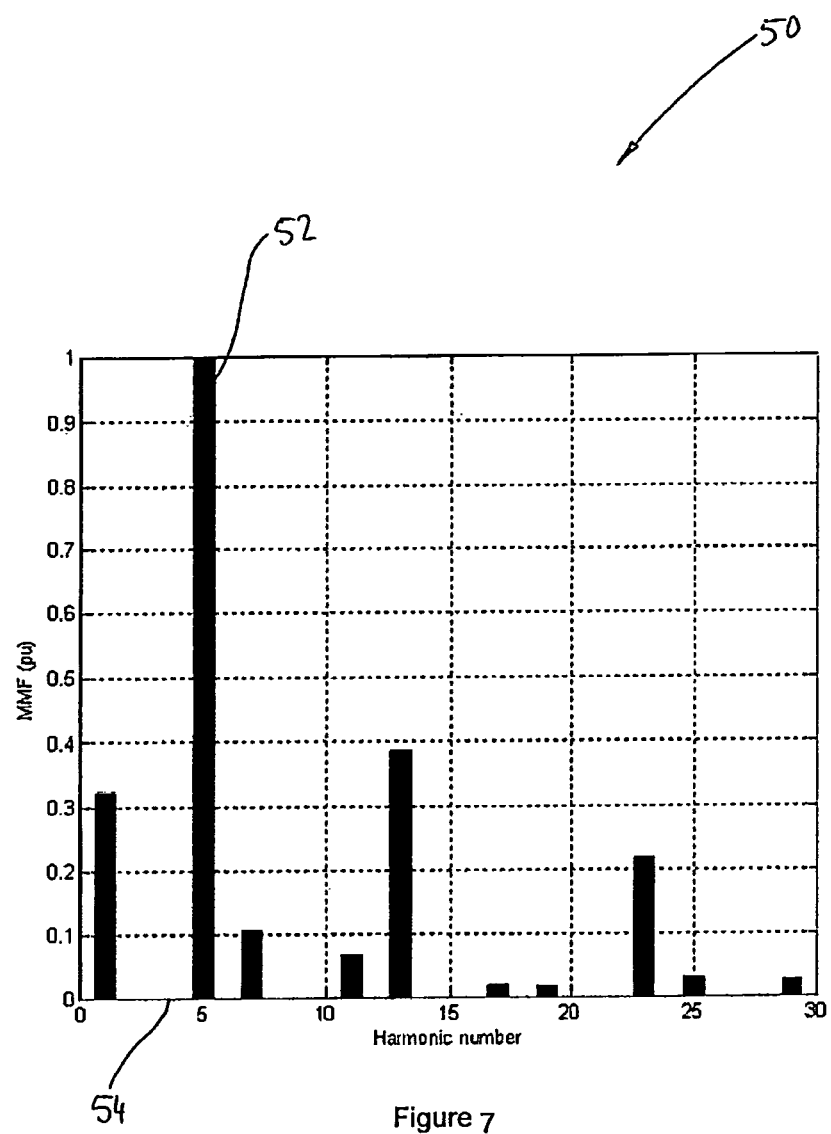
FIG. 7 is a graph of the magneto motive force harmonics for the electric machine of FIG. 6.

FIG. 7 shows the normalised harmonic distribution 50 of the combined travelling magnetic fields of the example of FIG. 6. The dominant working harmonic 52 (p-th) is shown to remain. The dominant undesirable harmonic 54 (p−1-th) is shown to be cancelled. The dominant working harmonic 52 is in the odd subset. The dominant undesirable harmonic 54 is in the even subset. All even harmonics have been cancelled. The remaining harmonics in the odd subset have a relatively low magnitude except for the 1-st, 13-th and 23-rd. However, for the same reasons as explained for the 18-slot, 4-pole-pair machine, the undesirable effects caused by these harmonics will be much less significant, and the unbalance magnetic force in the radial direction is eliminated or reduced.

The embodiments described with respect to FIGS. 1 to 7 concern fractional slot per pole per phase machines classified by:

$$N = s(2p \pm 1)$$

where N is the number of slots, p is the number of poles and s is the number of sets of slots. For the embodiments of FIGS. 3 to 7, s=2.

The arrangement of two phase winding sets to cancel the undesirable harmonics may be applied to all configurations of N=2p±1 slot-pole combinations as listed in Table 1 such that the slot-pole combinations for some embodiments of the present invention are those as listed in Table 2. Table 2 also provides for the energising direction of the coils of the second phase winding set with respect to the coils of the first phase winding set. This is labelled as the polarity between the phase winding sets.

TABLE 2

| Number of pole-pairs p | Number of slots N | q | Offset between two 3-phase windings (number of slots) | Polarity between the phase winding sets |
|---|---|---|---|---|
| 4 | 18 | 3/4 | 9 | same |
| 5 | 18 | 3/5 | 9 | opposite |
| 7 | 30 | 5/7 | 15 | opposite |
| 8 | 30 | 5/8 | 15 | same |
| 10 | 42 | 7/10 | 21 | same |
| 11 | 42 | 7/11 | 21 | opposite |
| 13 | 54 | 9/13 | 27 | opposite |
| 14 | 54 | 9/14 | 27 | same |
| 16 | 66 | 11/16 | 33 | same |
| 17 | 66 | 11/17 | 33 | opposite |
| 19 | 78 | 13/19 | 39 | opposite |
| 20 | 78 | 13/20 | 39 | same |
| 22 | 90 | 15/22 | 45 | same |
| 23 | 90 | 15/23 | 45 | opposite |
| ... | ... | ... | ... | |

The arrangement is also applicable to any slot-pole combination with double the number of pole pairs and double the number of slots of the N=2p±1 configuration. For example, the arrangement is applicable to 36-slot 16-pole, 54-slot 24-pole, ..., etc, machines whose slot and pole number are integer multiples of 18-slot 4-pole pair with q=3/4.

Figure 8:
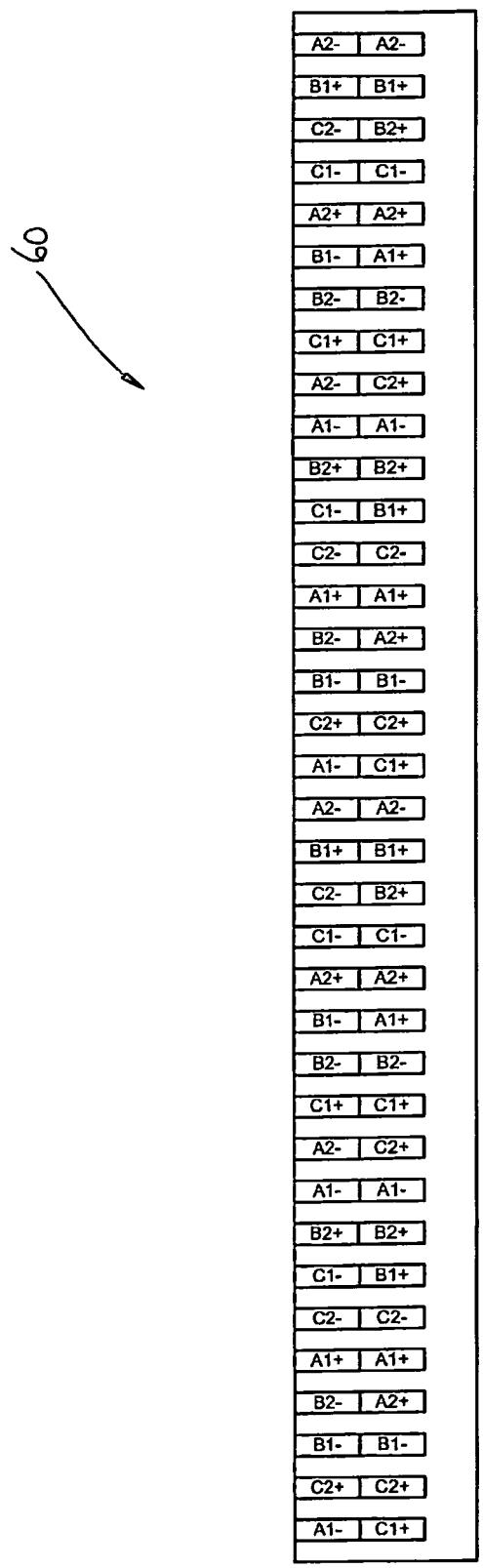
FIG. 8 is a view of a stator for use in an electric machine according to an embodiment of the present invention.

The same offsetting technique as shown in FIGS. 3 to 7 can be employed to further eliminate undesirable harmonics. By way of example, the number of slots in the 18-slot 4-pole pair design shown in FIGS. 3 and 4 may be doubled to 36-slots as shown in FIG. 8. Here, the relationship of the number of slots N to the number of pole pairs p is given by N=s(2p±1) where s=4. As per the machine of FIGS. 3 and 4, there is a first and a second phase winding set, each divided into 3-phase windings positioned in the stator 60. The first 3-phase windings are denoted as A1, B1 and C1 and the second 3-phase windings as A2, B2 and C2. In this example, the coil span is four slot-pitches instead of the two slot-pitch coil span of the examples in FIGS. 3, 4 and 6, because the number of slots is doubled from 18 slots to 36. For an 4-pole pair rotor, the slot-pitch is $2\pi \times 4/36 = \pi/9$ electrical degrees.

The second 3-phase windings A2, B2 and C2 are positioned with respect to the first 3-phase windings A1, B1 and C1 by an offset of 9 slots. In the rotary motor configuration this corresponds to a mechanical offset of 90 mechanical degrees. The offset in electric degrees for the 4-pole-pair rotor is 9×10×4=360° or 2π radians. Using the notation of the example of FIG. 4, this can also be written as an electrical offset of pπ/2. Thus, the resultant 4-th order working mmf space harmonics (the p-th harmonic where p is the number of pole pairs) produced by the first and second phase winding sets are in phase with respect to each other. However, the phase shift between the 2, 6, 10, 14, 18, 22, ... -th harmonics produced by the first phase winding set and those by the second phase winding set is π, 3π, 5π, 7π, 9π, 11π, ... . Therefore, these harmonics have the same magnitude but in the opposite direction and are cancelled with each other by the winding configuration of FIG. 8. It will be appreciated that electrical offset is equal to the mechanical offset times the number of pole pairs.

Figure 9:
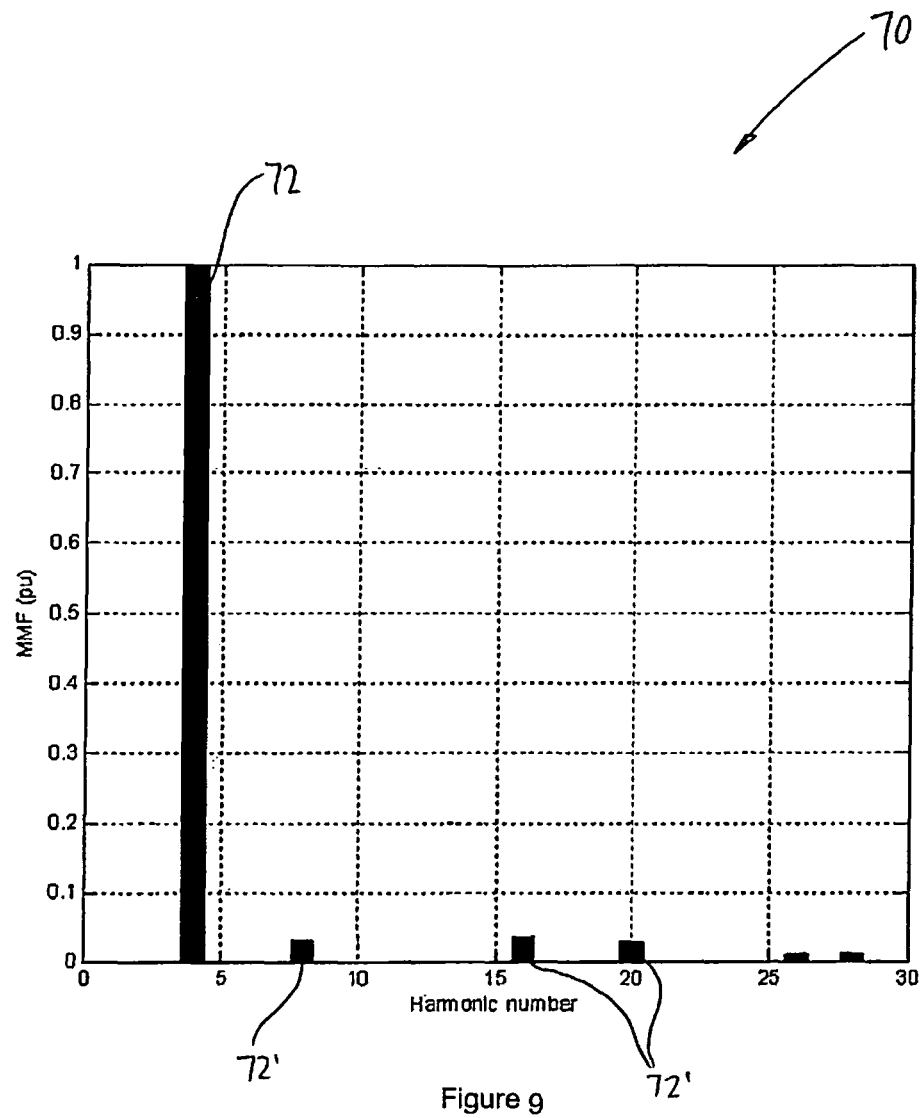
FIG. 9 is a graph of the magneto motive force harmonics for the electric machine of FIG. 8.

FIG. 9 shows the resultant normalised mmf distribution 70. As with the embodiment of FIG. 4, all odd harmonics have been eliminated. However, in addition to the cancellation of the odd harmonics, even harmonics with order equal to 2, 6, 10, 14, 18, 22, ... have also been eliminated. Integer multiples 72' of the 4-th order harmonic 72 are not eliminated because the offset 4π, 8π, 12π, ..., means they are in phase.

Figure 10:
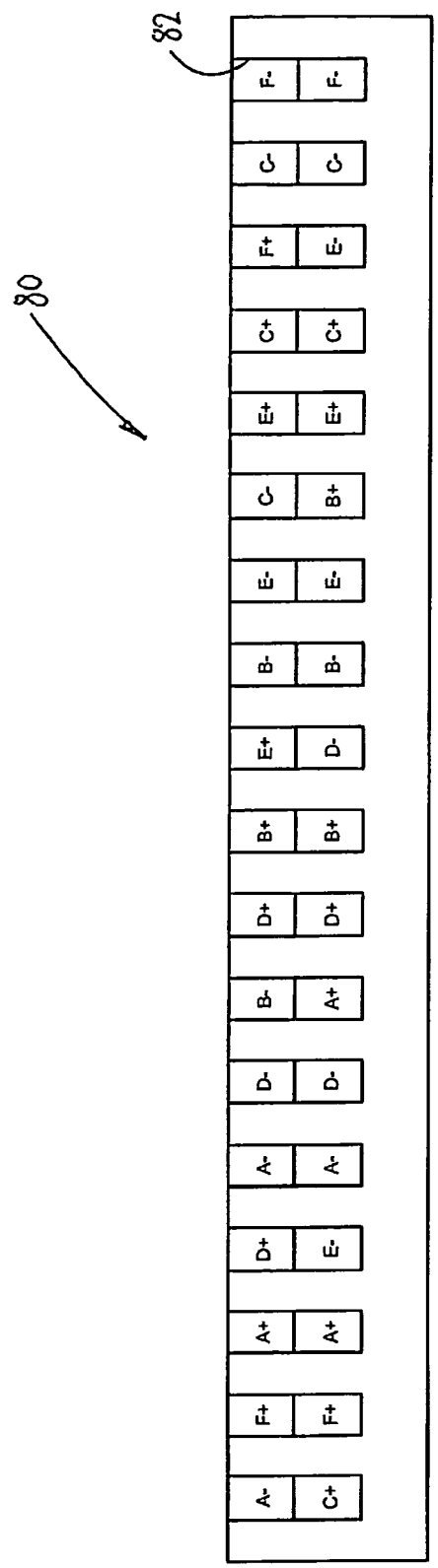
FIG. 10 is a view of a stator for use in an electric machine according to an embodiment of the present invention.

According to an embodiment of the present invention a 6-phase machine with a single star connection may be formed. FIG. 10 shows a stator 80 having 18-slots 82 for operation with a 4-pole-pair, 6-phase machine where A, D, B, E, C, and F phases constitute a balanced 6-phase system with a phase shift between two adjacent phases being 2π/6 electric degrees. For example, the phase winding for phase D is 3-slots away from the phase winding for phase A, and the electrical offset is 3×2πp/N=4/3π, but D has an opposite polarity to A and therefore has an polarity offset of +π. Therefore, the phase shift between A and D is 4π/3+π=2π−π/3=−π/3=−2π/6. The mechanical offset between A and E is 9-slots or 4π electrical degrees (as calculated above), but E has an opposite polarity to A and therefore has an polarity offset of π. When phase E is excited with current which has an electrical phase shift of π, the total offset between the phase windings of A and E is therefore equal to 4π+π+π=6π. Similar relations are true for phase D and C, and B and F. Therefore, as in the example relating to FIG. 4, the 4-th mmf harmonic is retained and all odd harmonics, including the dominant undesirable harmonic (the 5-th harmonic) are cancelled.

Figure 11:
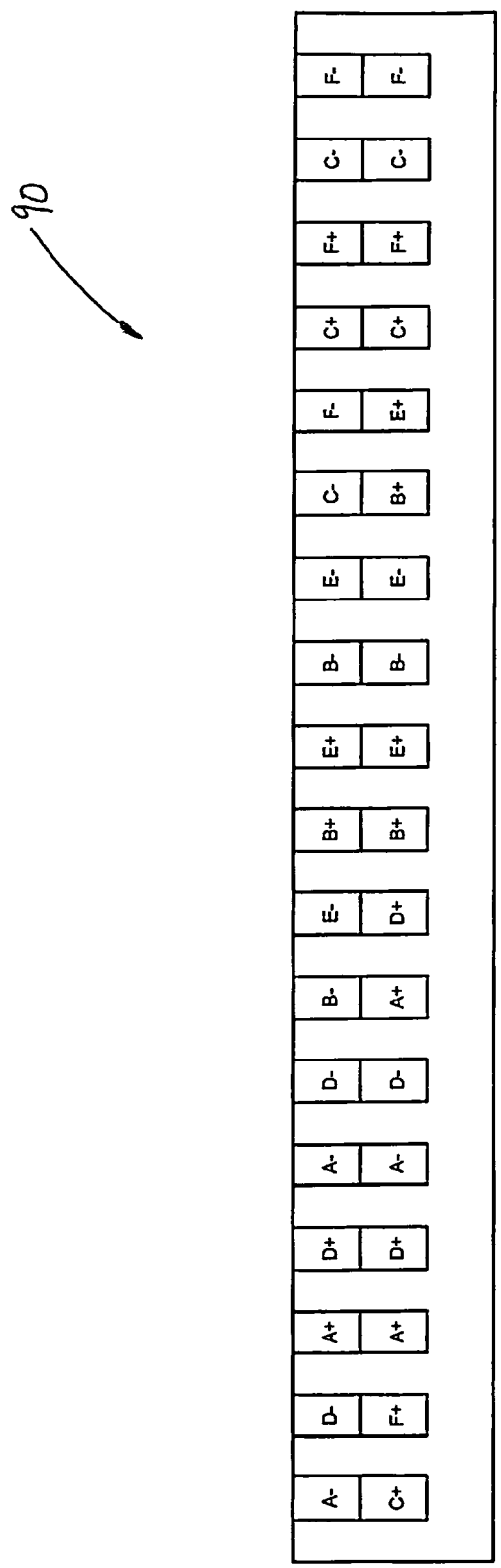
FIG. 11 is a view of a stator for use in an electric machine according to the present invention.

According to an embodiment of the present invention there is a 6-phase machine which contains two 3-phase systems, (A, B, C) and (D, E, F) each being star connected and supplied with 3-phase balanced currents may be. The phase shift between the phase winding sets (as per the foregoing description) of the two 3-phase systems is chosen depending on the offset between corresponding phases, e.g. phase A and phase D. FIG. 11 shows a stator 90 of an 18-slot 4-pole-pair example in which the offset between (A, B, C) and (D, E, F) is one slot-pitch and the resulting electrical offset between A and D, B and E, C and F is 1×2πp/N=8π/9 electrical radians. A phase offset in time between A and D is chosen to offset D from A by 4π/9. Similar to the example relating to FIG. 4, the 4-th mmf harmonic is retained and all odd harmonics, including the dominant undesirable harmonic (the 5-th harmonic) are reduced or cancelled. Other offsets, such as, 3, 5, 7, 9, 11, 13, 15, and 17 slots are also possible, and the resultant phase shifts are 4π/3, 2π/9, 10π/9, 0, 8π/9, 16π/9, 2π/3, and 14π/9 electrical radians, respectively. It should be noted that an appropriate phase shift in time in each phase should be applied based on the offset in space between phase windings A, B and C, and D, E and F that is used.

Figure 12:
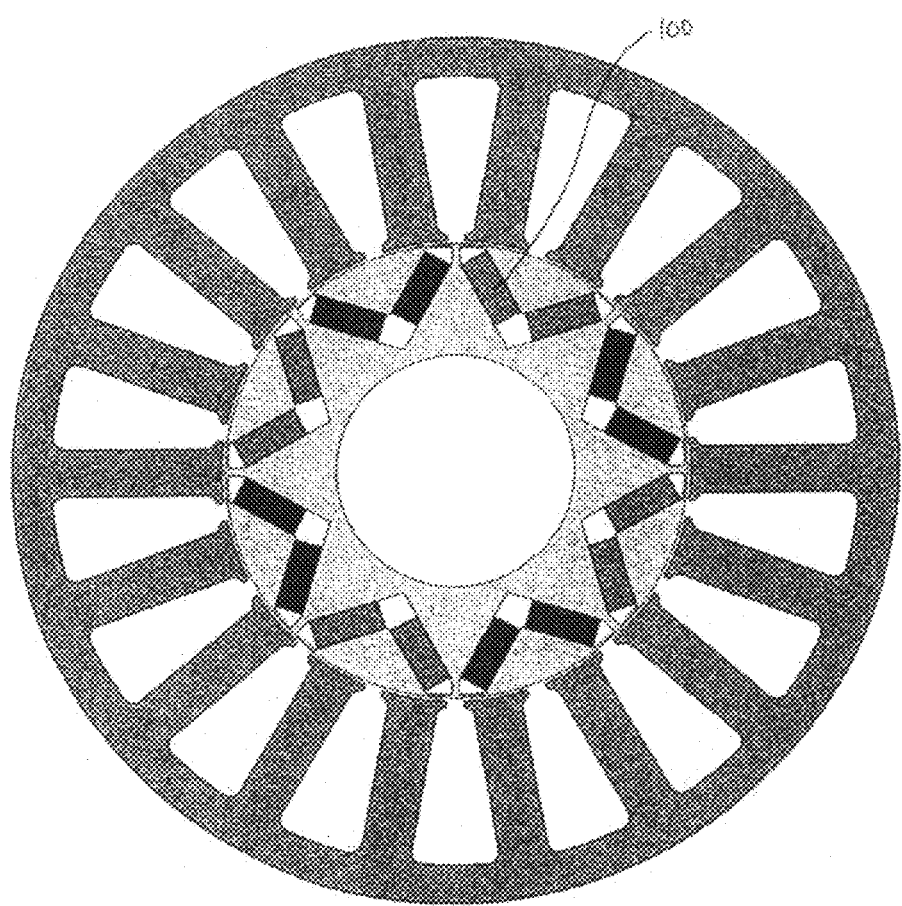
FIG. 12 is an end view of an electric machine according to an embodiment of the present invention.
Figure 13:
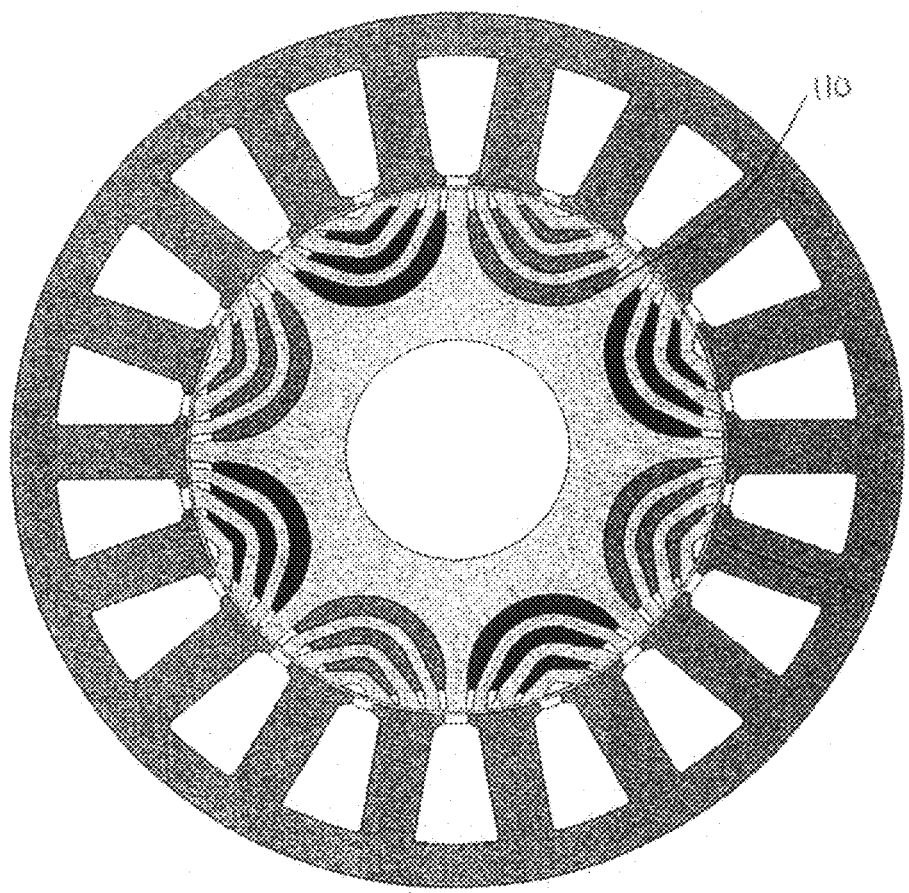
FIG. 13 is an end view of an electric machine according to an embodiment of the present invention.
Figure 14:
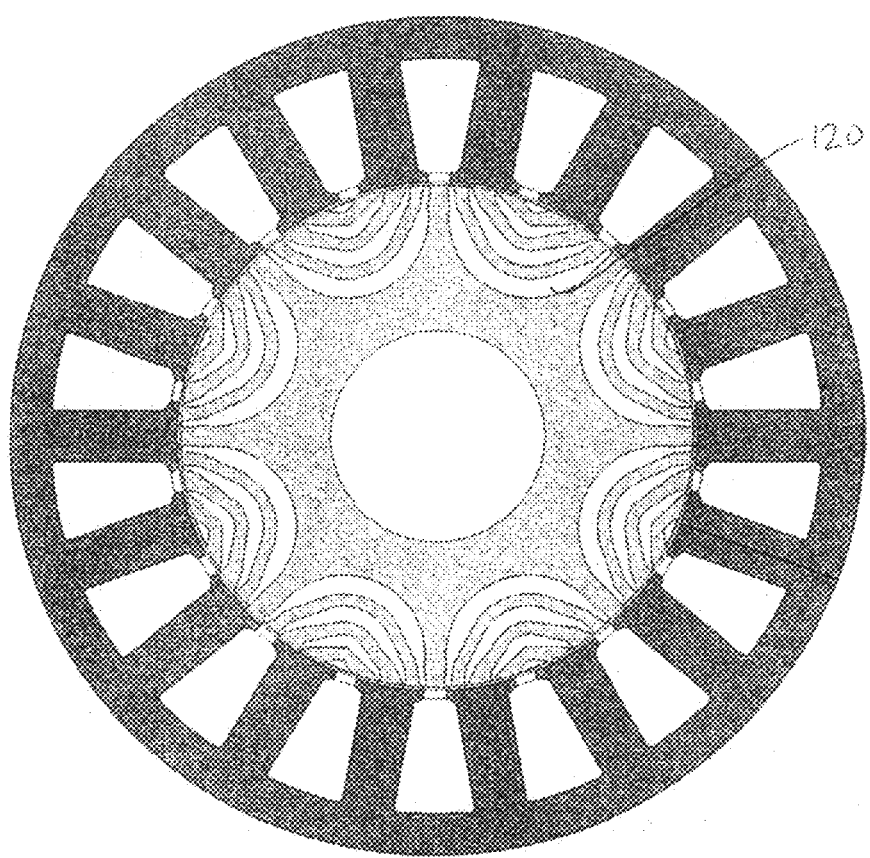
FIG. 14 is an end view of an electric machine according to an embodiment of the present invention.

The winding configurations of FIGS. 3 to 11 can be employed to design permanent magnet machines, including machines having surface mounted poles 20 (i.e. poles mounted on an outer surface of the rotor), as shown in FIG. 3 and machines having interior mounted poles 100 (i.e. machines having poles mounted in the interior of the rotor), as shown in FIG. 12, and permanent magnet 110 assisted synchronous reluctance machine, as shown in FIG. 13, where low cost ferrite magnets 110 may be used The winding configuration can also be used with synchronous reluctance machines, as shown in FIG. 14, where the rotor 120 does not use any magnets, as well as induction machines with cage bar rotor, or wound rotor, and wound field synchronous machines including the claw pole type, with the benefits of high torque/power density, high efficiency and low torque ripple.

Some embodiments of surface mounted permanent magnet machines as shown in FIG. 3 may provide a reduction in eddy current loss in rotor magnets due to elimination or reduction of most significant undesirable harmonics. This may lead to low rotor loss and low cost manufacturing as circumferential and axial segmentations of magnets are no longer necessary. Some embodiments of interior mounted permanent magnet machines as shown in FIG. 12, may provide increases in the reluctance torque and/or reduction in rotor iron losses, which leads to high torque density, and high efficiency. High reluctance torque and low undesirable mmf harmonics resulting from embodiments of the invention can also be exploited in permanent magnet assisted synchronous reluctance machines, as shown in FIG. 13, and synchronous reluctance machines, as shown in FIG. 14, where the benefits of improved torque density and/or efficiency and lower cost may be provided.

Embodiments of the invention may also provide induction machines. Such embodiments may result in lower end-winding length, lower copper loss and hence high torque/power density and high efficiency as a result of low or very low mmf harmonic contents.

A method according to an embodiment of the present invention comprises:
(1) configure a first phase winding set having 3-phase windings (A1, B1, C1) for a slot and pole combination of N=2p±1 as per Table 1
(2) multiply the number of slots of the design by 2
(3) configure a second phase winding set having 3-phase windings (A2, B2, C2) for a slot and pole combination of N=2p±1 as per Table 1
(4) position the second 3-phase windings (A2, B2, C2) π mechanical radians offset from the first 3-phase winding phase parts (A1, B1, C1).
(5) connect A1 and A2 either in series or in parallel with the same polarity if the number of pole-pairs is even, or opposite polarity if the number of pole-pairs is odd and make similar connections for B1 and B2, and C1 and C2.

The invention also provides a method of at least reducing undesirable magnetic space harmonics in an electric machine, said method comprising:
a) providing a first travelling magnetic field having a predetermined phasing, said first travelling magnetic field comprising a first set of magnetic space harmonics comprising a working subset including a dominant working space harmonic and an undesirable subset including a dominant undesirable harmonic; and
b) providing a second travelling magnetic field having a predetermined phasing, said second travelling magnetic field comprising a second set of magnetic space harmonics comprising a working subset including a dominant working space harmonic, and an undesirable subset including a dominant undesirable harmonic;
wherein said travelling magnetic fields are offset to at least reduce the undesirable subsets of said first and second magnetic space harmonics.

It should be noted that throughout the foregoing embodiments, the slot of the stator may be any means that comprises the slot windings of the phase winding. In the rotary machine, the rotor may be placed inside or outside of the stator.

Throughout the description and claims of this specification, the words "comprise" and "contain" and variations of the words, for example "comprising" and "comprises", means "including but not limited to", and is not intended to (and does not) exclude other additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:
1. An electric machine comprising:
a stator; and
a rotor, wherein
the rotor bears a predetermined number p of pole pairs, and
the stator comprises a predetermined number N of slots and a predetermined number s of sets of windings of a predetermined number m of phases, wherein
the predetermined number N of slots is associated with the predetermined number p of pole pairs by N=s(2p±1) or any integer multiple thereof, where s=2 or s=4, and a total electrical offset between one set of magneto motive force (mmf) harmonics generated by one set of windings and another set of mmf harmonics generated by another set of windings is nπ or (nπ+π) for each corresponding harmonic number n.

2. The electric machine of claim 1, wherein a dominant desirable harmonic corresponds to n=p and a dominant undesirable harmonic corresponds to n=p±1.

3. The electric machine of claim 1, wherein the sets of windings are mechanically offset by a mechanical offset of a predetermined number (2p±1) of slots.

4. The electric machine of claim 1, wherein the total electrical offset is based on energizing directions of windings of the sets of windings.

5. The electric machine of claim 1, wherein the total electrical offset comprises at least one of a predetermined slot offset φ and a predetermined polarity offset θ.

6. The electric machine of claim 5, wherein the predetermined slot offset φ is given by φ=w2πp/N, w being a predetermined number of slots.

7. The electric machine of claim 5, wherein the total electrical offset is the sum of the predetermined slot offset φ and the predetermined polarity offset θ.

8. The electric machine of claim 1, wherein one set of windings is mechanically offset from another set of windings by pπ/2.

9. The electric machine of claim 1, wherein the total electrical offset is such that corresponding harmonics in the one set of mmf harmonic and the another set of mmf harmonics at least one of constructively or destructively interfere.

10. The electric machine of claim 9, wherein corresponding odd harmonics constructively interfere and corresponding even harmonics destructively interfere.

11. The electric machine of claim 9, wherein corresponding even harmonics constructively interfere and corresponding odd harmonics destructively interfere.

12. The electric machine of claim 1, wherein m=3.

13. The electric machine of claim 1, wherein the rotor is rotatably journalled about the stator.

14. The electric machine of claim 1, wherein the rotor is linearly journalled about said stator.

* * * * *